3,163,537
BEER PRODUCTION WITH AMINE MODIFIED CLAYS
Raymond L. McAdam, San Anselmo, Richard G. Shaler, Jr., San Rafael, and Richard G. Shaler, San Anselmo, Calif., assignors to American Tansul Company, San Francisco, Calif.
No Drawing. Filed June 7, 1961, Ser. No. 115,328
6 Claims. (Cl. 99—48)

This invention relates to a novel method for treating malt beverages such as beer and ale after fermentation in order to improve their clarity, stability, and taste. More particularly, the method involves treating beer with certain modified clays during the conventional brewing procedure following fermentation.

Specifically, the present invention relates to a new method of "chill-proofing" beer or other beverages through the use of a vinyl pyridine modified swelling gelling clay such as those of the montmorillonite group, and preferably hectorite. Previously, such clays have been used during the processing of beer for improving the stability of the beer, both in the pure clay form or in some modified form. The present modification of the clay is a new departure in clay modification and its use results in a surprising increase in the yield of beer through sludge reduction while providing a product having excellent stability.

The term "stability" as used herein has a broad connotation as understood by those skilled in the art and refers to the prevention or absence of hazes in the beer, of turbidity during shelf life of the beverage, inhibition or prevention of wildness in the finished packaged beverage, and generally includes the maintenance of the product in a condition characterized by desirable taste and general acceptability. Also, the term "beer" as used herein should be construed to include other similar malt beverages such as ales.

Beer production follows a generally accepted sequence of steps: First, aqueous extract from suitable grain must be fermented to produce the beer. After fermentation has been completed, the temperature is dropped to approximately 30° F. and the beer is transferred from the fermentation equipment into a storage vessel for a rest or aging period at about 30–32° F. The rest period may be as little as five days and in some cases as much as three months. Carbon dioxide may or many not be introduced into the beer during the rest period. The $CO_2$ is used to partially carbonate the beverage and to purge the liquid of entrapped air. After storage, the beer is put through a pre-clarification operation. This is usually accomplished with some mechanical means such as a centrifuge or a filter. The beer is then transferred into a finishing storage tank for another storage period of about 1–5 days during which final carbonation is accomplished. Following the finishing period, the beer is polish filtered. The beer is then in a form as found in the final product when purchased by the consumer.

During the course of the processing subsequent to fermentation, several treatments have become standard which serve to stabilize and otherwise make the final product more desirable. Thus, the beer may be treated with a clay in accordance with the method described in United States Patent No. 2,416,007, dated February 18, 1947. That patent teaches the addition of an aqueous suspension of a magnesium silicate clay into the beer for removing foreign and partially soluble substances from beer such as undesirable proteins and proteinaceous complexes. An alternative method for introducing the clay into the beer in dry form is a more recent important improvement and is described and claimed in copending application Serial No. 97,254, filed March 21, 1961. Either the wet or dry addition techniques may be used in coordination with the present invention.

The present invention provides a method of treating beer after fermentation which comprises treating the beer with a vinyl pyridine modified swelling gelling clay, and then completing the processing of the beer. In essence the present method may be considered the same as any of the alternative prior art beer treating methods except that the clay employed has been modified with a vinyl pyridine. By so modifying the clay, several important advantages are obtained as compared with the prior art methods.

The advantages herein obtained will better be understood by considering the phenomenon occurring when clay-treating beer. When clay is added to beer, it is believed that the clay serves to adsorb the various molecular protein, proteinaceous complexes, and heavy metal complexes that are present in the beer after it has gone through the fermentation stage of brewing. It is believed that the adsorption of the foregoing materials and perhaps others which have not been identified, results in the desirable stability of the treated beer.

The suspended clay and its adsorbed components are then permitted to agglomerate and settle to the bottom in a colloidal gel-like mass. From 1% to 10% of the liquid treated remains in the sediment or sludge as waste. It is extremely difficult, if not impossible for practical purposes, to recover the entrapped beer.

The particular modified clays of the present invention significantly and surprisingly reduce the amount of sediment or sludge ultimately formed upon the addition of the clay to the beer and thereby results in an appreciable greater yield or recovery of the beer being processed. Equally significant, the vinyl pyridine in the present modified clays does not impart any detectable unwanted taste qualities to the treated product. This is in marked distinction with other methods which may use various amines including vinyl pyridines and their polymers in treating beer. The use of the amine by itself imparts an undesirable flavor to the beer whereas incorporation of the amine in the clay avoids the problem.

As in prior procedures, the modified clay may be introduced at any point in processing after fermentation. In accordance with prior procedures, completion of processing of the beer includes removal of the clay which has previously been dispersed in the beer and may be accomplished by filtration and/or centrifuging, for example.

Also in accordance with prior techniques, additional treatments for stabilizing and clarifying beer may concurrently be employed. These additional steps include the use of reducing agents such as metabisulfites, or preferably $SO_2$ gas itself, in accordance with United States Patent No. 2,916,377, dated December 8, 1959. It is also common practice to employ a proteolytic enzyme such as bromelin and/or papain. The use of these other materials in the present process is unchanged from prior art techniques in any respect such as quantities employed or point in the brewing where it is added. For example, when $SO_2$ gas is used it may be introduced in the range of about 5–30 parts per million and the enzyme dosage may be between about 500–15,000 activity units per 100 barrels of beer processed.

The method is practiced by treating or dispersing any swelling gelling clay which has been suitably modified in the beer after fermentation. Any of the following types and classes of clays are suitable in the present method if they have been modified with a vinyl pyridine.

*Cation-Exchangeable Inorganic Clays*

A. Natural clays:
 Bentonites—
  Wyoming bentonite
 Montmorillonites—
  Hectorite
  Beidellite
  Saponite
  Nontronite
  Sepiolite
  Biotite
  Vermiculite
 Zeolites—
  Edingtonite
  Chabazite
  Natrolite
  Mordinites
B. Synthetic clays:
 Magnesia-silica-sodium oxide
 Lime-silica-potassium oxide
 Baria-silica-lithium oxide
C. Synthetic zeolites:
 Complex aluminum silicates exchangeable cation—
  Hydrogen
  Sodium
  Potassium
  Barium
  Magnesium
  Ammonium While any vinyl pyridine modified clay of the foregoing types may be used, it is preferred to use a montmorillonite clay and, most preferably, to use the montmorillonite member known as hectorite.

The selected clay to be employed is modified with any vinyl pyridine. Generally, all vinyl pyridines containing at least 1 vinyl substituent on the ring are contemplated as being within the scope of the present invention when present in one of the foregoing clays. Preferably however, the vinyl pyridine contains only 1 vinyl substituent which is suitably mono-unsaturated and a straight chain hydrocarbon such as the vinyl group itself, the allyl group, the methallyl group, and like radicals of up to about 12 carbon atoms. The vinyl substituent may be on any position of the ring.

In addition to the vinyl substituent, other non-interfering substituents may be present on the ring including the lower alkyl radicals of about 1–6 carbon atoms.

The vinyl pyridine modified clays for use in the present method may be prepared in accordance with copending application Serial No. 115,312, filed June 7, 1961. In general a suitable method for their preparation comprises contacting the selected clay with the selected vinyl pyridine in the presence of a strong acid in an aqueous medium. More specifically the process is carried out by intermixing or contacting a suitable clay with a suitable vinyl substituted cyclic amine of the types described above in aqueous solution in the presence of $H^+$. This induces an ion exchange reaction wherein the amine is exchanged for the exchangeable cation in the clay. The amine modified clay may then be removed from solution, dried or further processed as desired by any suitable method.

The $H^+$ in solution is conveniently supplied by any suitable organic acid or inorganic acid. Preferably the acid employed is a strong acid such as benzene sulfonic acid, hydrochloric acid, or the like.

The reaction is conveniently conducted at atmospheric pressure and at room temperature although these conditions may be varied as desired as will be obvious to those skilled in the art.

Preferably the amine is used in a stoichiometric excess with respect to the exchange capacity of the clay selected. This will result in the desired modification. Here again the amount of amine employed may be varied to suit the particular conditions or purposes for which the final product is desired.

The order of combination of the reactants may be varied as desired. Thus it is possible to convert the clay to hydrogen form by mixing the clay with acid and then adding the amine. Alternatively it is suitable to convert the amine to acid salt and then contact the amine acid salt with the clay in aqueous solution and thereby cause the desired ion exchange to occur.

For commercial feasibility the clay is not directly modified with the selected cyclic amine. This is because the direct modification is very difficult and time consuming requiring for example running the naturally occurring clay through an ion exchange column containing the hydrogen ion source in its $H^+$ form.

Rather, in the preferred embodiment using hectorite as an example of a starting clay reactant in its naturally occurring sodium form, the clay is first converted to a calcium clay with preferably a calcium salt such as calcium chloride. The following example will illustrate the method of preparation of the amine modified clay.

A 5% aqueous slurry of 25 grams of purified hectorite is reacted with 1.38 grams of an aqueous solution of calcium chloride and thoroughly agitated until the calcium chloride has reacted with substantially all of the clay. The resulting calcium clay is treated with diluted hydrochloric acid to form a hydrogen clay. A 1½ times stoichiometric excess of 4-vinyl pyridine is added to the hydrogen clay in aqueous solution. The reaction product flocculates and is filtered to provide a 4-vinyl pyridine modified hectorite. This material is then used in the present process for treating beer.

As previously noted, the clay for use in the present method is employed as the clay of prior art methods. Accordingly, the amounts to be used are substantially equivalent to amounts of other types of modified or unmodified clays and is most suitably added in a quantity of about 120–150 parts per million of beer.

To illustrate the details and advantages of the present method the following example is offered. The Pulfrich unit referred to in the example is defined as a term of relative turbidity as measured by a Zeiss photometer. It is a comparison of the refracted light from a sample of beer with a light source as seen through a ground glass filter and is expressed as percent of the source light through the ground glass filter. For example, a reading of 20 Pulfrich units indicates that a value equal to 20% of the value of the light source as seen through the ground glass filter was refracted in the sample.

EXAMPLE

A quantity of untreated, i.e. unchill-proofed beer, was obtained. The beer das decarbonated and an aqueous dispersion of the various clays listed in the following table were introduced with a hypodermic needle into 200 ml. samples of the beer. The beer and clay dispersion was placed in a colorimeter tube and inverted twice to insure adequate distribution of the clay throughout the beer. The beer was then set aside and allowed to settle for 24 hours. After 24 hours the sludge volume was read and a visual measurement of turbidity was taken. The sludge was gauged with a measuring device, calibrated in milliliters, and designed for use in conjunction with the colorimeter tubes. Turbidity was measured by visual inspection of each colorimeter tube and results are stated in approximate Pulfrich units.

Table

| Sample | Additive | Amount of Additive, parts per million | Sludge in Ml. | Turbidity in Pulfrich Units |
|---|---|---|---|---|
| 200 ml. of untreated beer. | Normally occurring hectorite. | 200 | 20 | 20 |
| Do | Hectorite in calcium form [1]. | 200 | 5 | 70 |
| Do | 2-vinyl pyridine modified hectorite. | 200 | 3 | 70 |
| Do | do | 300 | 4 | 70 |
| Do | 4-vinyl pyridine modified hectorite. | 200 | 3 | 70 |
| Do | do | 300 | 4 | 70 |
| Do | Control—no additive. | | 0 | 150 |

[1] Prepared in accordance with patent application Serial No. 44,487 filed June 13, 1960.

Comparison of the results of the foregoing tests show that the treatment of beer with the vinyl pyridine in accordance with the present method results in a beer having a highly satisfactory low turbidity. At the same time the sludge formation and thereby the beer loss, was significantly reduced.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method of treating beer after fermentation which comprises dispersing about 120–500 parts per million of a vinyl pyridine modified swelling gelling clay in the beer for a time sufficient to chill-proof the same, and then completing the processing of the beer.

2. A method in accordance with claim 1 wherein the clay is a montmorillonite clay.

3. A method of treating beer after fermentation which comprises dispersing about 120–500 parts per million of 2-vinyl pyridine modified hectorite in the beer for a time sufficient to chill-proof the same, and then completing the processing of the beer.

4. A method of treating beer after fermentation which comprises dispersing about 120–500 parts per million of 4-vinyl pyridine modified hectorite in the beer for a time sufficient to chill-proof the same, and then completing the processing of the beer.

5. A method of treating beer after fermentation which comprises dispersing about 120–500 parts per million of 2-vinyl pyridine modified hectorite in the beer for a time sufficient to chill-proof the same, and then completing the processing of the beer including removal of the dispersed hectorite.

6. A method of treating beer after fermentation which comprises dispersing about 120–500 parts per million of 4-vinyl pyridine modified hectorite in the beer for a time sufficient to chill-proof the same, and then completing the processing of the beer including removal of the dispersed hectorite.

References Cited in the file of this patent
UNITED STATES PATENTS

| 2,767,177 | Erickson | Oct. 16, 1956 |
| 2,916,377 | Shaler et al. | Dec. 8, 1959 |
| 3,024,209 | Ferrigno | Mar. 6, 1962 |